(12) United States Patent
Cogan et al.

(10) Patent No.: US 10,891,094 B2
(45) Date of Patent: *Jan. 12, 2021

(54) GANGED IMPOSITION SORT SYSTEM

(71) Applicant: PTI Marketing Technologies Inc., Solana Beach, CA (US)

(72) Inventors: Douglas Neal Cogan, Solana Beach, CA (US); Daniel Stuart Korn, Chicago, IL (US)

(73) Assignee: PTI Marketing Technologies Inc., Solana Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,646

(22) Filed: Aug. 21, 2018

(65) Prior Publication Data

US 2019/0179581 A1 Jun. 13, 2019

Related U.S. Application Data

(63) Continuation of application No. 15/454,301, filed on Mar. 9, 2017, now Pat. No. 10,089,049.

(Continued)

(51) Int. Cl.
*G06F 3/12* (2006.01)

(52) U.S. Cl.
CPC .......... *G06F 3/1262* (2013.01); *G06F 3/1211* (2013.01); *G06F 3/1243* (2013.01);
(Continued)

(58) Field of Classification Search
CPC .... G06F 3/1262; G06F 3/1243; G06F 3/1257; G06F 3/1211
(Continued)

(56) References Cited

U.S. PATENT DOCUMENTS 4,951,233 A 8/1990 Fujiwara et al.
5,263,132 A 11/1993 Parker et al.
(Continued)

FOREIGN PATENT DOCUMENTS

JP 2014-029577 2/2014
WO WO 2010/007357 1/2010
(Continued)

OTHER PUBLICATIONS

International Search Report and Written Opinion for International Application No. PCT/US2017/021594, dated May 23, 2017, 10 pages.

(Continued)

*Primary Examiner* — Gabriel I Garcia
(74) *Attorney, Agent, or Firm* — Cooley LLP

(57) ABSTRACT

Systems, methods, and apparatus for composing an imposed, intermingled output in pre-sorted postal order from an intermediate file are disclosed. A composition engine populates a template with variable printing data from a data file and generates an intermediate file. The composition engine repeats the process and generates a second intermediate file from a second data file and template. The intermediate files are merged and intermingled to generate a third intermediate file. The third intermediate file is converted to a renderable format and transmitted to a printing system to produce a ganged, imposed output.

34 Claims, 10 Drawing Sheets

Related U.S. Application Data

(60) Provisional application No. 62/306,005, filed on Mar. 9, 2016.

(52) U.S. Cl.
CPC .......... *G06F 3/1245* (2013.01); *G06F 3/1252* (2013.01); *G06F 3/1257* (2013.01); *G06F 3/1288* (2013.01)

(58) Field of Classification Search
USPC ........................................................ 358/1.15
See application file for complete search history.

(56) References Cited

U.S. PATENT DOCUMENTS

| | | |
|---|---|---|
| 6,397,120 B1 | 5/2002 | Goldman |
| 6,594,034 B1* | 7/2003 | Bloomquist ............ B41B 21/32 358/1.18 |
| 6,636,648 B2 | 10/2003 | Loui et al. |
| 6,650,433 B1 | 11/2003 | Keane et al. |
| 6,697,843 B1* | 2/2004 | Carlin .................... G06Q 10/08 705/406 |
| 6,718,535 B1 | 4/2004 | Underwood |
| 6,771,384 B1 | 8/2004 | Laverty et al. |
| 6,804,573 B2 | 10/2004 | Goldman |
| 6,826,727 B1 | 11/2004 | Mohr et al. |
| 6,836,695 B1 | 12/2004 | Goldman |
| 6,928,610 B2 | 8/2005 | Brintzenhofe et al. |
| 6,947,808 B2 | 9/2005 | Goldman |
| 6,976,798 B2 | 12/2005 | Keane et al. |
| 6,986,105 B2 | 1/2006 | Walker, Jr. |
| 6,992,794 B2 | 1/2006 | Keane et al. |
| 6,993,209 B1 | 1/2006 | Schowtka et al. |
| 7,016,756 B2 | 3/2006 | Goldman |
| 7,016,757 B2 | 3/2006 | Goldman |
| 7,020,838 B2 | 3/2006 | Tsykora |
| 7,085,825 B1 | 8/2006 | Pishevar et al. |
| 7,120,634 B2 | 10/2006 | Jecha et al. |
| 7,124,107 B1 | 10/2006 | Pishevar et al. |
| 7,133,050 B2 | 11/2006 | Schowtka |
| 7,133,149 B2 | 11/2006 | Keane et al. |
| 7,145,670 B2 | 12/2006 | Keane et al. |
| 7,187,465 B2 | 3/2007 | Keane et al. |
| 7,188,310 B2 | 3/2007 | Schwartzkopf |
| 7,322,007 B2 | 1/2008 | Schowtka et al. |
| 7,339,598 B2 | 3/2008 | Schowtka et al. |
| 7,340,673 B2 | 3/2008 | Malone |
| 7,398,470 B2 | 7/2008 | Keane |
| 7,456,993 B2 | 11/2008 | Walker, Jr. |
| 7,461,332 B2 | 12/2008 | Brintzenhofe et al. |
| 7,489,324 B2 | 2/2009 | Royal et al. |
| 7,490,057 B2 | 2/2009 | Connolly et al. |
| 7,495,796 B2 | 2/2009 | Keane et al. |
| 7,519,548 B2 | 4/2009 | Hanechak et al. |
| 7,530,937 B2 | 5/2009 | Moody |
| 7,542,155 B2 | 6/2009 | Paskalev et al. |
| 7,577,731 B2 | 8/2009 | Frey et al. |
| 7,584,424 B2 | 9/2009 | Hanechak |
| 7,587,256 B2 | 9/2009 | Goldman |
| 7,604,227 B2 | 10/2009 | Moody |
| 7,607,084 B2 | 10/2009 | Malone et al. |
| 7,619,638 B2 | 11/2009 | Walker, Jr. et al. |
| 7,675,528 B2 | 3/2010 | Walker, Jr. et al. |
| 7,676,402 B2 | 3/2010 | Moody |
| 7,676,744 B2 | 3/2010 | Hanechak |
| 7,681,122 B1 | 3/2010 | Tsykora |
| 7,711,845 B2 | 5/2010 | Pishevar et al. |
| 7,746,358 B2 | 6/2010 | Eilers |
| 7,797,167 B2 | 9/2010 | Hanechak et al. |
| 7,839,531 B2 | 11/2010 | Sugiyama |
| 7,843,466 B2 | 11/2010 | Hanechak |
| 7,885,861 B2 | 2/2011 | Mills |
| 7,903,122 B2 | 3/2011 | Mills et al. |
| 7,920,297 B2 | 4/2011 | Doggett, III et al. |
| 7,920,939 B2 | 4/2011 | Goldman et al. |
| 7,961,200 B2 | 6/2011 | Walker, Jr. et al. |
| 7,980,177 B2 | 7/2011 | Styles et al. |
| 7,983,964 B2 | 7/2011 | Hanechak et al. |
| 7,990,564 B2 | 8/2011 | Hanechak |
| 7,996,756 B2 | 8/2011 | Eilers et al. |
| 8,041,607 B1 | 10/2011 | Coursol |
| 8,072,468 B2 | 12/2011 | Hanechak |
| 8,095,232 B2 | 1/2012 | Goldman et al. |
| 8,099,263 B2 | 1/2012 | Walker, Jr. et al. |
| 8,103,130 B2 | 1/2012 | Royal et al. |
| 8,117,556 B2 | 2/2012 | Eilers |
| 8,170,367 B2 | 5/2012 | Moody et al. |
| 8,170,708 B2 | 5/2012 | Goldman et al. |
| 8,203,745 B2 | 6/2012 | Hanechak |
| 8,219,238 B2 | 7/2012 | Goldman |
| 8,225,198 B2 | 7/2012 | Hanechak |
| 8,238,643 B2 | 8/2012 | Niles Peretz et al. |
| 8,248,625 B2 | 8/2012 | Paskalev et al. |
| 8,281,715 B2 | 10/2012 | Lehner et al. |
| 8,291,110 B2 | 10/2012 | Pishevar et al. |
| 8,296,648 B2 | 10/2012 | Tirrella |
| 8,305,631 B2 | 11/2012 | Moody et al. |
| 8,352,863 B2 | 1/2013 | Eilers |
| 8,371,220 B2 | 2/2013 | Styles et al. |
| 8,385,690 B2 | 2/2013 | Royal et al. |
| 8,412,498 B2 | 4/2013 | Walker, Jr. et al. |
| 8,438,476 B2 | 5/2013 | Uhlig et al. |
| 8,451,490 B2 | 5/2013 | Sugiyama |
| 8,467,593 B2 | 6/2013 | Niles Peretz et al. |
| 8,491,960 B2 | 7/2013 | Kiy |
| 8,498,018 B2 | 7/2013 | Doggett et al. |
| 8,502,834 B2 | 8/2013 | Hanechak et al. |
| 8,515,572 B2 | 8/2013 | Goldman et al. |
| 8,521,617 B2 | 8/2013 | Hanechak et al. |
| 8,522,140 B2 | 8/2013 | Hanechak |
| 8,532,810 B2 | 9/2013 | Goldman |
| 8,547,588 B2 | 10/2013 | Giannetti et al. |
| 8,565,914 B2 | 10/2013 | Marrese et al. |
| 8,572,512 B2 | 10/2013 | Walker |
| 8,587,614 B2 | 11/2013 | Stevenson |
| 8,588,529 B2 | 11/2013 | Nykyforov |
| 8,588,954 B2 | 11/2013 | Goldman et al. |
| 8,595,627 B2 | 11/2013 | Schowtka et al. |
| 8,606,606 B2 | 12/2013 | Andersen et al. |
| 8,606,607 B2 | 12/2013 | Torres-Rocca et al. |
| 8,634,089 B2 | 1/2014 | Keane et al. |
| 8,634,674 B2 | 1/2014 | Hanechak |
| 8,650,191 B2 | 2/2014 | Connolly et al. |
| 8,660,683 B2 | 2/2014 | Goldman et al. |
| 8,675,243 B2 | 3/2014 | Hyman |
| 8,676,658 B2 | 3/2014 | Marcus et al. |
| 8,694,494 B2 | 4/2014 | Hanechak |
| 8,706,286 B2 | 4/2014 | Nykyforov |
| 8,711,399 B2 | 4/2014 | Keller et al. |
| 8,713,419 B2 | 4/2014 | Malone et al. |
| 8,732,003 B2 | 5/2014 | Keane et al. |
| 8,775,271 B2 | 7/2014 | Mills |
| 8,775,920 B2 | 7/2014 | Eilers et al. |
| 8,782,131 B2 | 7/2014 | Pishevar et al. |
| 8,783,553 B2 | 7/2014 | Hyman et al. |
| 8,793,195 B2 | 7/2014 | Weinberg et al. |
| 8,793,570 B2 | 7/2014 | Hanechak |
| 8,798,781 B2 | 8/2014 | Eugene |
| 8,799,262 B2 | 8/2014 | Paduroiu |
| 8,807,031 B2 | 8/2014 | Styles et al. |
| 8,810,603 B2 | 8/2014 | Moody et al. |
| 8,818,551 B2 | 8/2014 | Marrese et al. |
| 8,818,773 B2 | 8/2014 | Eugene et al. |
| 8,820,201 B2 | 9/2014 | Marcos et al. |
| 8,827,256 B2 | 9/2014 | Marcos et al. |
| 8,831,766 B2 | 9/2014 | Goldman et al. |
| 8,842,327 B2 | 9/2014 | Nakatsuka |
| 8,851,616 B2 | 10/2014 | Moreau et al. |
| 8,904,038 B2 | 12/2014 | Pishevar et al. |
| 8,941,868 B2 | 1/2015 | Arpino et al. |
| 8,943,398 B2 | 1/2015 | Eilers et al. |
| 8,990,206 B2 | 3/2015 | Connolly et al. |
| 9,002,137 B2 | 4/2015 | Hanechak |

(56) References Cited

U.S. PATENT DOCUMENTS

| | | |
|---|---|---|
| 9,015,581 B2 | 4/2015 | Nykyforov |
| 9,020,790 B2 | 4/2015 | Walker, Jr. et al. |
| 9,038,537 B2 | 5/2015 | Aylward et al. |
| 9,058,318 B2 | 6/2015 | Hanechak |
| 9,081,519 B2 | 7/2015 | Moreau et al. |
| 9,103,059 B2 | 8/2015 | Goldman et al. |
| 9,114,645 B2 | 8/2015 | Gerber |
| 9,132,660 B2 | 9/2015 | Ngo et al. |
| 9,147,004 B2 | 9/2015 | Coursol |
| 9,150,990 B2 | 10/2015 | Goldman et al. |
| 9,152,362 B2 | 10/2015 | Keane et al. |
| 9,156,293 B2 | 10/2015 | Gerber et al. |
| 9,163,343 B2 | 10/2015 | Goldman et al. |
| 9,200,397 B2 | 12/2015 | Goldman |
| 9,207,898 B2 | 12/2015 | Cogan et al. |
| 9,213,460 B2 | 12/2015 | Nurse et al. |
| 9,223,456 B2 | 12/2015 | Mokhtarzada et al. |
| 10,089,049 B2 * | 10/2018 | Cogan .................. G06F 3/1262 |
| 2002/0049702 A1 | 4/2002 | Aizikowitz et al. |
| 2003/0020939 A1 | 1/2003 | Sugahara |
| 2007/0127073 A1 | 6/2007 | Goel et al. |
| 2008/0086369 A1 | 4/2008 | Kiat et al. |
| 2008/0201185 A1 | 8/2008 | Winkelman et al. |
| 2008/0297834 A1 | 12/2008 | Yamaguchi |
| 2011/0261412 A1 | 10/2011 | Nakatsuka |
| 2014/0164076 A1 | 6/2014 | Marcos et al. |
| 2014/0313544 A1 | 10/2014 | Hasegawa |
| 2017/0262241 A1 | 9/2017 | Cogan et al. |

FOREIGN PATENT DOCUMENTS

| | | |
|---|---|---|
| WO | WO 2010/073507 | 7/2010 |
| WO | WO 2013/038823 | 3/2013 |

OTHER PUBLICATIONS

Extended European Search Report for European Application No. 17764105.7, dated Jan. 15, 2020, 8 pages.

* cited by examiner

| | A | B | C | D | E | F | G | H | I | J | K | L |
|---|---|---|---|---|---|---|---|---|---|---|---|---|
| 1 | First Name | CustomerID | Last Name | Address 1 | Address 2 | City | State | ZIP | Gender | BarcodeID | Agent | Layout |
| 2 | Pat | | Alps | 5110 Com | Apt. F | San Diego | CA | 92101 | | [9210166 | Karer | Presidio |
| 3 | Veronica | | Bennet | 4850 Century Plaza | San Diego | CA | 92101 | F | [9210166 | Karer | Sunshine |
| 4 | Jack | | Albadr | 2001 W Washington | San Diego | CA | 92101 | M | [9210166 | Rogers | Presidio |
| 5 | Pat | | Alhasan | 8424 Naak | Apt. 2C | San Diego | CA | 92101 | | [9210166 | Smith | Sunshine |
| 6 | Willard | | Douglass | 1801 N Laf | Apt. 590 | San Diego | CA | 92101 | M | [9210166 | Karer | Presidio |
| 7 | Sophia | | Bruno | 3500 N Laf | Apt. B202 | San Diego | CA | 92102 | F | [9210166 | Rogers | Presidio |
| 8 | Lydia | | Clemson | 6245 N Cottage Ave | San Diego | CA | 92102 | | [9210166 | Smith | Sunshine |
| 9 | Ahndee | | Drummel | 1801 N Sel | Apt. C407 | San Diego | CA | 92102 | F | [9210166 | Karer | Sunshine |
| 10 | Pauline | | Bruno | 5750 W 56th St | San Diego | CA | 92102 | F | [9210166 | Rogers | Presidio |
| 11 | Thomas | | Carter | 8320 Madison Ave | San Diego | CA | 92102 | M | [9210166 | Smith | Presidio |
| 12 | Nancy | | Eggman | 9240 N Md | Apt. 210 | San Diego | CA | 92103 | F | [9210166 | Karer | Presidio |
| 13 | Martin | | Dromper | 4807 E 38th St | San Diego | CA | 92103 | M | [9210166 | Rogers | Presidio |
| 14 | Linda | | Dromper | 6920 Park | Apt. 107 | San Diego | CA | 92103 | F | [9210166 | Smith | Sunshine |
| 15 | Kris | | Darricon | 1801 N Sel | Apt. 300 | San Diego | CA | 92103 | F | [9210166 | Karer | Sunshine |
| 16 | Kate | | Eyepul | 8402 Harci | Apt. 731 | San Diego | CA | 92103 | F | [9210166 | Rogers | Sunshine |

FIG. 8

GANGED IMPOSITION SORT SYSTEM

CROSS-REFERENCE TO RELATED APPLICATIONS

This application is a continuation of and claims priority to U.S. application Ser. No. 15/454,301, now U.S. Pat. No. 10,089,049, filed Mar. 9, 2017, entitled "GANGED IMPOSITION SORT SYSTEM," which claims the benefit of U.S. Provisional Application Ser. No. 62/306,005, entitled GANGED IMPOSITION POSTAL SORT SYSTEM, filed on Mar. 9, 2016, the contents of which are hereby incorporated by reference herein in their entireties for all purposes. This application is also related to U.S. patent application Ser. No. 12/534,717, entitled APPARATUS & METHODS FOR IMAGE PROCESSING OPTIMIZATION FOR VARIABLE DATA PRINTING, filed on Aug. 3, 2009, the content of which is hereby incorporated by reference herein in its entirety for all purposes.

FIELD OF THE INVENTION

The present disclosure generally relates to customized digital printing and, more particularly, to aspects of variable data printing and postal sorting.

BACKGROUND

With the advent of e-mail, texting, instant messaging, and other electronic communications, the volume of standard mail has dropped from 102.5 billion pieces in 2006 to 80 billion pieces in 2015. Historically, the U.S. Postal Service (USPS) was responsible for the postal activities of preparing, sorting, and transporting mail. In order to reduce operational costs, the USPS began offering discounts to mailers who engage in a number of activities that reduce the costs incurred by the USPS in processing mail. For example, worksharing discounts are offered for activities performed by the mailer such as (1) barcoding and preparing mail to be sorted by USPS automated equipment to reduce the need for manual sorting; (2) presorting mail by ZIP Code or specific delivery location; and (3) entering mail at a USPS facility that generally is closer to the final destination of the mail. In 2015, about 85% of the market-dominant mail volume is workshared mail.

One specific worksharing discount is for sorting mail into a carrier route delivery point sequence (DPS). The DPS includes the mail arranged by address in the sort order that a postal carrier would deliver the mail to the addressees. In this manner, a postal carrier receives a presorted stack of mail and then proceeds to deliver the mail by starting at the front of the stack and delivering each piece of mail along the carrier predetermined route. Note that other sorting methods may be used for various other delivery, storage and warehousing locations.

Mail includes both letters and post cards. Post cards are typically double sided and contain the names and addresses of the sender and recipient. Post cards also typically include a message from the sender to the recipient and may include both text and graphics. For a mailing campaign, a single sender may send hundreds or thousands or more of pieces of mail to recipients. In some instances, each piece of mail can include the same message to each recipient, or in some instances, each piece of mail can include a different message for each recipient.

Mail is typically prepared by a printing operation. As printing technologies migrate from traditional printing methods such as lithography to digital printing, use of digital printers and associated processing of printed images and page layouts in digital printing systems has dramatically increased. While traditional printing methods may still be more cost effective for large quantities of standardized print on a single page size, the cost of digital printing systems and associated media has continued to decrease, making digital printing more affordable. In addition, digital printing technology can often facilitate customized printing in a more cost-effective way that traditional high volume printing methods.

One type of customized printing is known as variable-data printing (VDP) (also known as variable-information printing or VIP or VI or variable-data publishing). VDP is a form of on-demand printing in which elements such as text, graphics and images may be changed from one printed piece to the next, without stopping or slowing down the printing method. For example, a set of personalized letters or postcards, each with the same basic layout, can be printed with a different name and address on each letter, while retaining other common elements, such as images, text, associated drop shadows, or other common elements. Variable data printing is typically used for direct marketing, customer relationship management, advertising and invoicing on self-mailers, brochures, or postcard campaigns, but may also be used for a range of other printing applications where customization is required. An article describing VDP entitled "Speaking in Tongues: Sorting Out Variable Data Printing Languages by Eliot Harper, incorporated by reference herein, is available at www.fujixerox.com.au/products/image/media/TSR-0906-Speak-Tongues-reprint.pdf. VDP printing may be implemented using a language such as Personalized Print Markup Language or PPML, which is described in an article entitled "Introduction to the Personalized Print Markup Language: The PPML Family of XML Standards, available at ppml.podi.org/component/option,com_docman/Itemid,0/task,doc_download/gid,13&Itemid=/ which explains how PPML can be used to implement VDP by caching images and reusing them.

VDP is a direct outgrowth of digital printing technology, which harnesses computer systems, digital printing devices, and specialized software to create high-quality black and white or full color documents with a look and feel comparable to conventional offset printing. VDP enables the mass customization of documents via digital print technology, as opposed to the mass-production of a single document using offset lithography. For example, instead of producing 10,000 copies of a single document to deliver a single message to 10,000 customers, variable data printing provides for printing 10,000 unique documents with customized messages for each customer.

Digital printing presses may be capable of printing on a variety of types and sizes of card or paper stock. Printing on larger paper sizes may be more efficient and increase productivity, but would require printing multiple pieces of mail on a single sheet of paper stock or across the width of a roll of paper stock. However, not every print order requires many pieces, and traditionally, print orders that are sent to a digital printing press from different locations are not co-mingled because the data sets are usually different and are typically closely associated with the design of the pieces of mail within print order. As a result of this, the relative cost of printing smaller print orders can be higher than larger print orders.

Current systems provide for sorting the output for a single print job for delivery; or for ganging up the output from several print jobs of the same size for imposition. Ganged imposition is often used with VDP, such that many documents of the same size, but personalized to the individual recipient, are laid out to the plate specifications of a printer in a single press run. At the same time, there is a need to optimize, against multiple different personalized print tasks, by providing for the ganged imposition intermingling different print jobs of the same size for imposition and digital delivery to the press. However, if the intermingling of the like-sized print jobs does not preserve the sort order of the data (such as a postal sort order to optimize postage) considerable additional expenses result.

SUMMARY

The present disclosure relates to systems and methods for ganging and imposing print orders to improve digital printing efficiencies. For example, one innovative aspect of the subject matter described in this disclosure is implemented in a method comprising providing, to a composition engine, a first data file from a first data file storage location and a first template from a first template storage location. The method also includes providing, to the composition engine, a second data file from a second data file storage location and a second template from a second template storage location. Using the composition engine, a first intermediate file is generated from the first data file and the first template, and a second intermediate file is generated from the second data file and the second template. The composition engine receives a sorting data file from a third storage location and composes a third intermediate file including contents from the first intermediate file and the second intermediate file merged and intermingled based in part on the sorting data file.

The method may further comprise converting the third intermediate file into a renderable output file. The renderable output file may be at least one of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file. Converting the output to renderable format requires no additional input data other than the print order of the commingled records.

The method may further comprise transmitting the renderable output file to a printing system, and may further comprise rendering a printed output on a sheet of paper stock. The printed output on the sheet of paper stock may be a ganged and imposed sheet of postcards including variable printing data. The first intermediate file and the second intermediate file may be binary files. The method may further comprise storing the first intermediate file and the second intermediate file to a memory. The first intermediate file and the second intermediate file may contain positional data for variable print data locations within the first template and the second template. The sort order file may be a CSV file. The first data storage location and the second data storage location may be located on a same device. The first template and the second template may be stored in a same file. The composition engine may be part of a sub-system that also includes a typesetter human interface. The method may further comprise selecting, via the sub-system, the first template and the second template.

Another innovative aspect of the subject matter described in this disclosure is implemented in a method comprising providing, to a composition engine a master data file from a master data file storage location. A first data file, a second data file, and a sort order file are extracted from the master data file. A first template is retrieved from a first storage location and a second template is retrieved from a second storage location. Using the composition engine, a first intermediate file is generated from the first data file and the first template, and a second intermediate file is generated from the second data file and the second template. A third intermediate file is composed and includes contents from the first intermediate file and the second intermediate file that are merged and intermingled based in part on the sorting data file.

The method may further comprise converting the third intermediate file into a renderable output file. The renderable output file may be at least one of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file. Converting the output to renderable format requires no additional input data other than the print order of the commingled records.

The method may further comprise transmitting the renderable output file to a printing system and may further comprise rendering a printed output on a sheet of paper stock. The printed output on the sheet of paper stock may be a ganged and imposed sheet of postcards including variable printing data. The first intermediate file and the second intermediate file may be binary files. The method may further comprise storing the first intermediate file and the second intermediate file to a memory. The first intermediate file and the second intermediate file may contain positional data for variable print data locations within the first template and the second template. The sort order file may be a CSV file. The first data storage location and the second data storage location may be located on a same device. The first template and the second template may be stored in a same file. The composition engine may be part of a sub-system that also includes a typesetter human interface. The method may further comprise selecting, via the sub-system, the first template and the second template.

Another innovative aspect of the subject matter described in this disclosure is implemented in a method comprising composing an intermingled output in a pre-sorted postal order from a binary intermediate file to prepare a ganged and imposed sheet of postcards including variable printing data. The method includes providing, to a composition engine, a first data file from a first data file storage location and a first template from a first template storage location, and also providing, to the composition engine, a second data file from a second data file storage location and a second template from a second template storage location. Using the composition engine, a first binary intermediate file is generated from the first data file and the first template and a second binary intermediate file is generated from the second data file and the second template. A sorting data file is received at the composition engine from a third storage location. A third binary intermediate file is composed and includes contents from the first binary intermediate file and the second binary intermediate file merged and intermingled in the pre-sorted postal order based in part on the sorting data file. The third binary intermediate file is converted into a renderable output file. The renderable output file is transmitted to a printing system. The renderable output file is rendered on a sheet of paper stock. The printed output on the sheet of paper stock may be the ganged and imposed sheet of postcards including variable printing data.

Additional aspects of the present disclosure are further described below in conjunction with the drawings. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The following U.S. published applications are hereby incorporated herein by reference for all purposes:

Title: CENTRALIZED SYSTEM AND METHOD FOR MANAGING ENTERPRISE OPERATIONS; Application No. PCT/US99/26523; Publication No. WO 2000/030000; Application Date Nov. 9, 1999

Title: SYSTEM AND METHOD FOR CREATING, GENERATING AND PROCESSING USER-DEFINED GENERIC SPECS; application Ser. No. 09/780,099; Publication No. US 2002-0032694 A1; Application Date Feb. 9, 2001

Title: SYSTEMS & METHODS FOR PROVIDING VARIABLE DATA PRINTING (VDP) USING DYNAMIC FONT DOWNGRADING, application Ser. No. 12/571,387; Publication No. US-2011-0075196-A1; Application Date Sep. 30, 2009

Title: SYSTEMS & METHODS FOR PROVIDING VARIABLE DATA PRINTING (VDP) USING DYNAMIC FONT DOWNGRADING; Application No. PCT/US2010/050302; Publication No. WO 2011/041241; Application Date Sep. 24, 2010

Title: SYSTEMS & METHODS FOR PROVIDING VARIABLE DATA PRINTING (VDP) USING DYNAMIC FONT DOWNGRADING; application Ser. No. 14/269,802; Publication No. US-2014/0240731-A1; Application Date May 5, 2014

Title: APPARATUS & METHODS FOR IMAGE PROCESSING OPTIMIZATION FOR VARIABLE DATA PRINTING; application Ser. No. 12/534,717; Publication No. US-2011/0026042-A1; Application Date Aug. 3, 2009

Title: APPARATUS AND METHODS FOR IMAGE PROCESSING OPTIMIZATION FOR VARIABLE DATA PRINTING (VDP); Application No. PCT/US2010/044298; Publication No. WO2011/017361; Application Date Aug. 3, 2010

Title: APPARATUS & METHODS FOR IMAGE PROCESSING OPTIMIZATION FOR VARIABLE DATA PRINTING; application Ser. No. 14/105,955; Publication No. US-2014-0104650-A1; Application Date Dec. 13, 2013

Title: SYSTEM AND METHOD FOR PRINTABLE DOCUMENT JOB SUBMISSION; application Ser. No. 13/554,344; Publication No. US-2014-0022585-A1; Application Date Jul. 20, 2012

Title: SYSTEM AND METHOD FOR PRINTABLE DOCUMENT JOB SUBMISSION; Application No. PCT/US2013/051265; Publication No. WO 2014/015249; Application Date Jul. 19, 2013

Title: SYSTEM AND METHOD FOR PRINTABLE DOCUMENT VIEWER OPTIMIZATION; application Ser. No. 13/827,173; Publication No. US-2014-0281940-A1; Application Date Mar. 14, 2013

Title: SYSTEM AND METHOD FOR PRINTABLE DOCUMENT VIEWER OPTIMIZATION; Application No. PCT/US2014/025814; Publication No. WO2014/160100; Application Date Mar. 13, 2014

BRIEF DESCRIPTION OF THE DRAWINGS

The present disclosure is more fully appreciated in connection with the following Detailed Description taken in conjunction with the accompanying drawings. The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8 is an illustration of a master data file, according to embodiments of the present disclosure.

Figure 1:
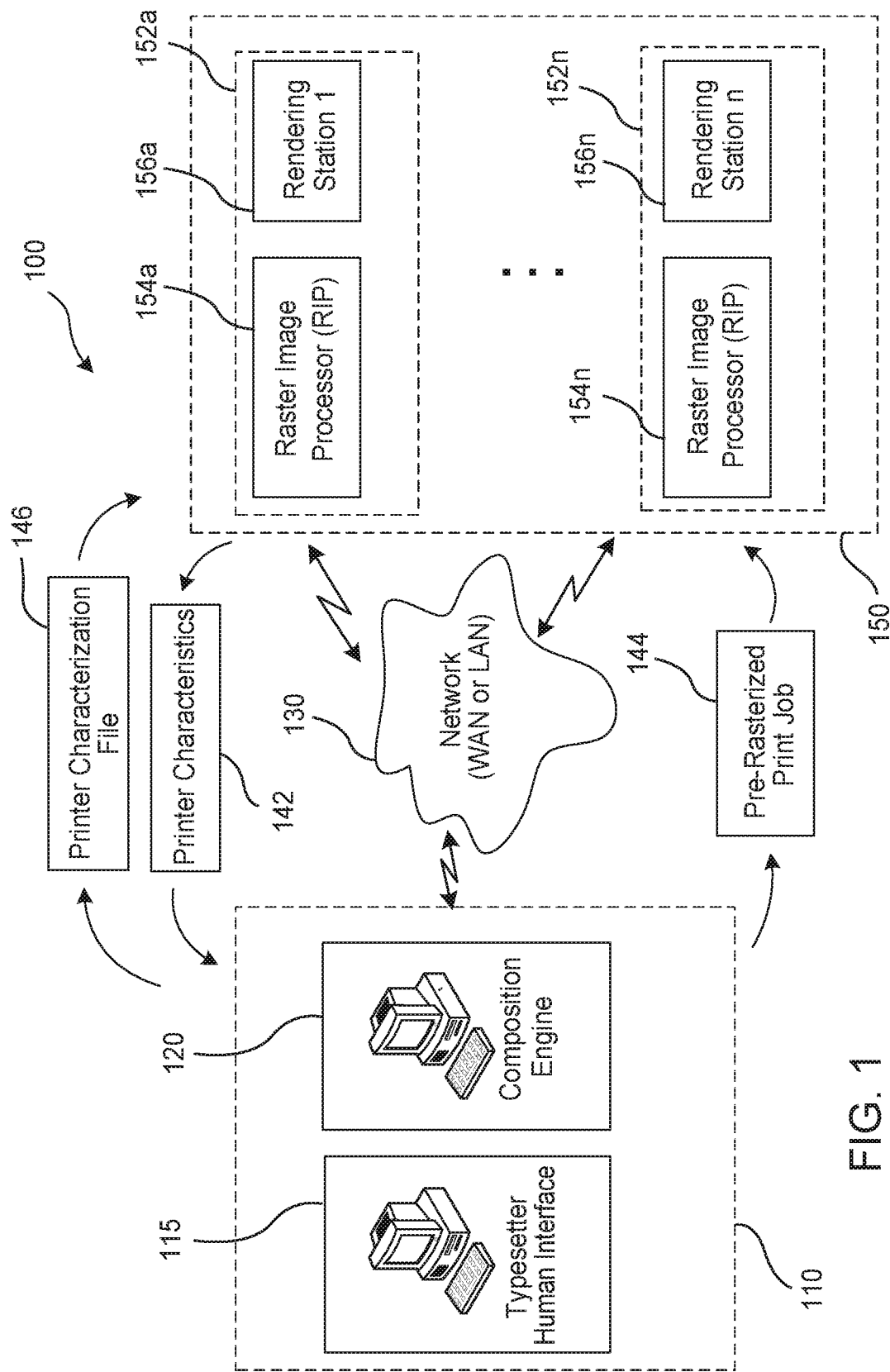
FIG. 1 is an illustration of a typical printing system on which embodiments of the present disclosure may be implemented.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

Following below are more detailed descriptions of various concepts related to, and embodiments of, inventive systems and methods for ganged imposition postal sorting of VDP documents. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Programs, like FusionPro available from PTI Marketing Technologies, Inc., allow a user to create a document by laying out frames on a page. The frames correspond to the positions of the various elements on the page. The elements can be graphics, text, or combinations thereof. The elements may be stored in databases and include variable or non-variable data. After the user has laid out the frames for optimal viewing on a given page size, the user is then able to preview the page to see a representation of the finished document. In one embodiment, a user creates a variable data layout by positioning multiple frames on a page.

In order to further describe details of various embodiments of the present disclosure, attention is now directed to FIG. 1 which illustrates a typical digital printing system 100 on which various embodiments of the present disclosure may be implemented. Printing system 100 includes two primary sub-sections—a composition or typesetting subsection (also denoted herein as composition system or typesetter) 110 and a printing subsection (also denoted herein as a printing system) 150. These subsections may be interconnected via a network 130 as shown in FIG. 1, such as a local area network (wired LAN, such as an Ethernet or other LAN), a wireless network, a wide area network (WAN), such as the Internet, a corporate network, or via other networking configurations. In some embodiments, subsections 110 and 150 need not be directly interconnected as shown in FIG. 1, but data and information may be transferred manually between them, such as by human users or operators. Data and information transferred between subsystems 110 and 150 may include a set of printer characteristics 142, a print job 144, a printer characteristics determination file 146, as well as other data or information (not shown).

Composition subsection 110 may include two computer sub-systems 115 and 120. Sub-system 115 is denoted herein as a typesetter human interface and is typically a computer system containing hardware and software configured to receive printer characteristics 142, which include information associated with the characteristics of a particular printer system (or systems) 152, store that information in a memory, and provide connectivity facilitating access to that information to sub-system 120 or transfer the received information to sub-system 120. Sub-system 115 may also be configured to communicate directly with printing subsection 150 to generate a printer characteristics determination file 146 to query for printer characteristics 142 of one or more printers 152a-152n, and/or other information, and receive printer characteristics 142 from the printing subsection 150.

As noted above, a RIP is required to generate raster elements of printed pages as well as to convert raster objects provided at a particular resolution and rotation into the printer's native resolution and rotation. Various techniques for performing these transformations are known in the art, however, this processing can become very computationally intensive as well as time consuming when done at the RIP. Consequently, if the processing requirements are sufficiently large, the RIP may not be able to keep up with the output speed of the rendering station of the printer system, which can slow down the printing output and affect overall printing efficiency.

Figure 2:
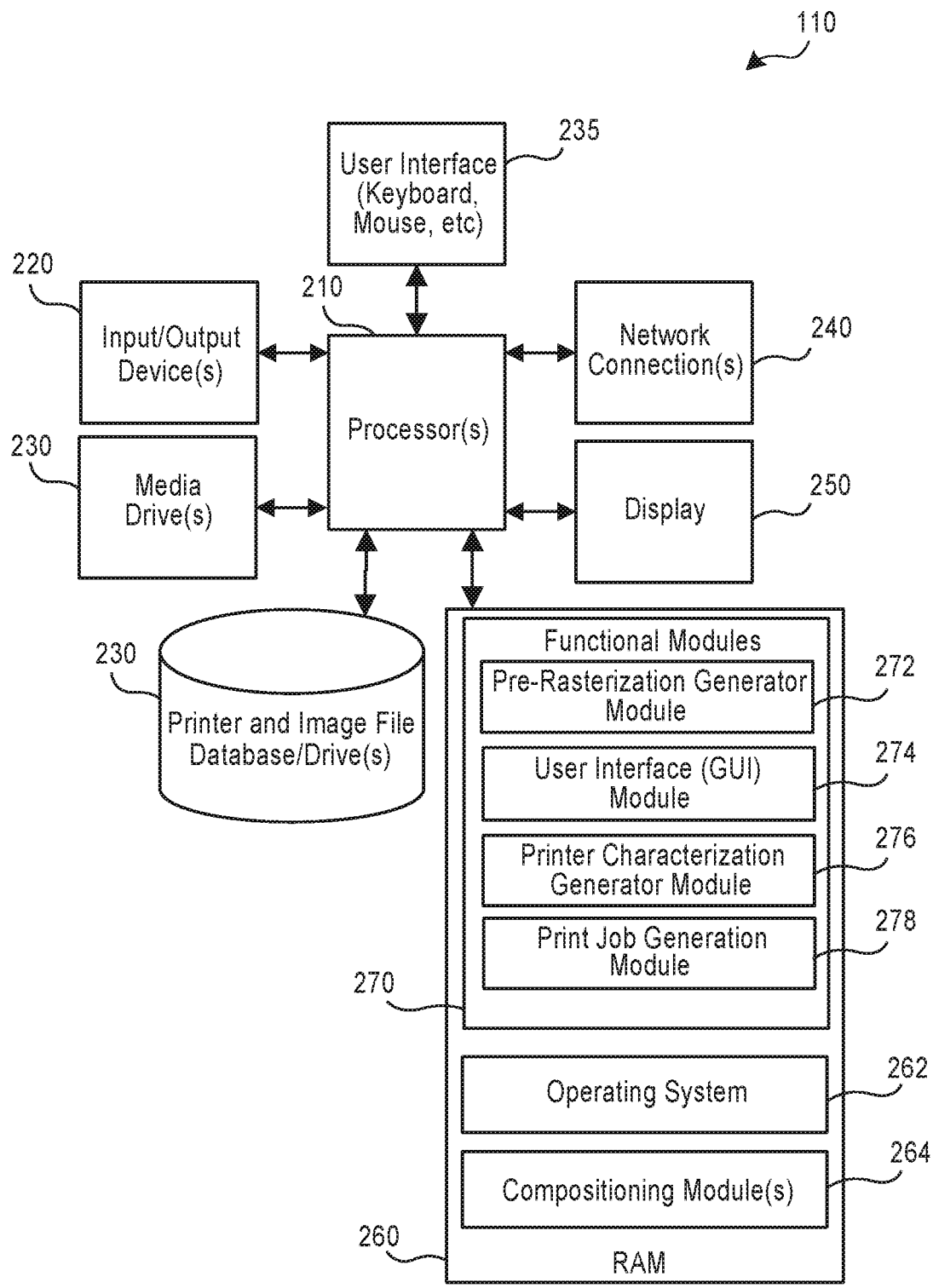
FIG. 2 is an illustration of an embodiment of a Composition/Typesetter System in accordance with aspects of the present disclosure.

Attention is now directed to FIG. 2, which illustrates a typical system configuration for a composition system or typesetting system, such as typesetter 110 as shown in FIG. 1. For purposes of brevity, the various components of FIG. 2 are shown in a simplified form, with some elements removed for purposes of clarity. For example, FIG. 2 illustrates components of a single computer system, however, two separate systems 115 and 120 may also be used as shown in FIG. 1, and/or other configurations may also be used.

Composition system 110 includes one or more processors 210, one or more memories or other program and data storage elements 260, and an image/content database 230, which may be part of memory 260. Memory 260 further includes functional modules for providing the various functionalities as is described herein. These functional modules may include hardware elements, software elements, firmware elements, and/or combinations of these elements to implement various functionalities. In particular, the functional modules may include a Pre-Rasterization Generator Module 272, a User Interface Module 272, a Printer Characterization Module 276, a Print Job Generator Module 278, and/or combinations of these various modules as well as other modules. In addition, memory 260 may include one or more operating systems 262 or other applications (not shown), as well as a compositioning module 264, which may be, for example, the Fusion Pro Desktop or another composition or typesetting application program. The functionality provided by the functional modules 270 may be incorporated into the compositioning module 264, such as via direct integration or via plug-ins or other incorporation mechanisms. In addition, compositioning module 264 may be a standalone application or may be integrated into another application, such as in the form of a plug-in or via other program integration mechanisms.

Composition system 110 may also include other elements such as one or more media drives 230 (removable hard disk drives, CD, DVD, BD drives, Flash memory drives, USB drives, and the like) to facilitate input, output and storage of print jobs, printer characterization data, image files and/or other data or information. In addition, composition system 110 may include one or more I/O devices 220, such as USB or Firewire interfaces, one or more user interfaces and associated hardware and/or software, such as keyboards, computer mice, trackballs, and the like, one or more network connections 240, such as wired or wireless network connections (Ethernet, Wi-Fi, etc.) to facilitate connectivity to other systems, such as printing system 150. A display 250, such as a CRT monitor, LCD monitor, or other visual output device may also be included to facilitate data and information input and output, user interface functionality, as well as to provide a composition interface and/or a display mechanism for viewing pre-rasterized page layouts or pre-rasterized objects in the printer's native resolution.

Figure 3:
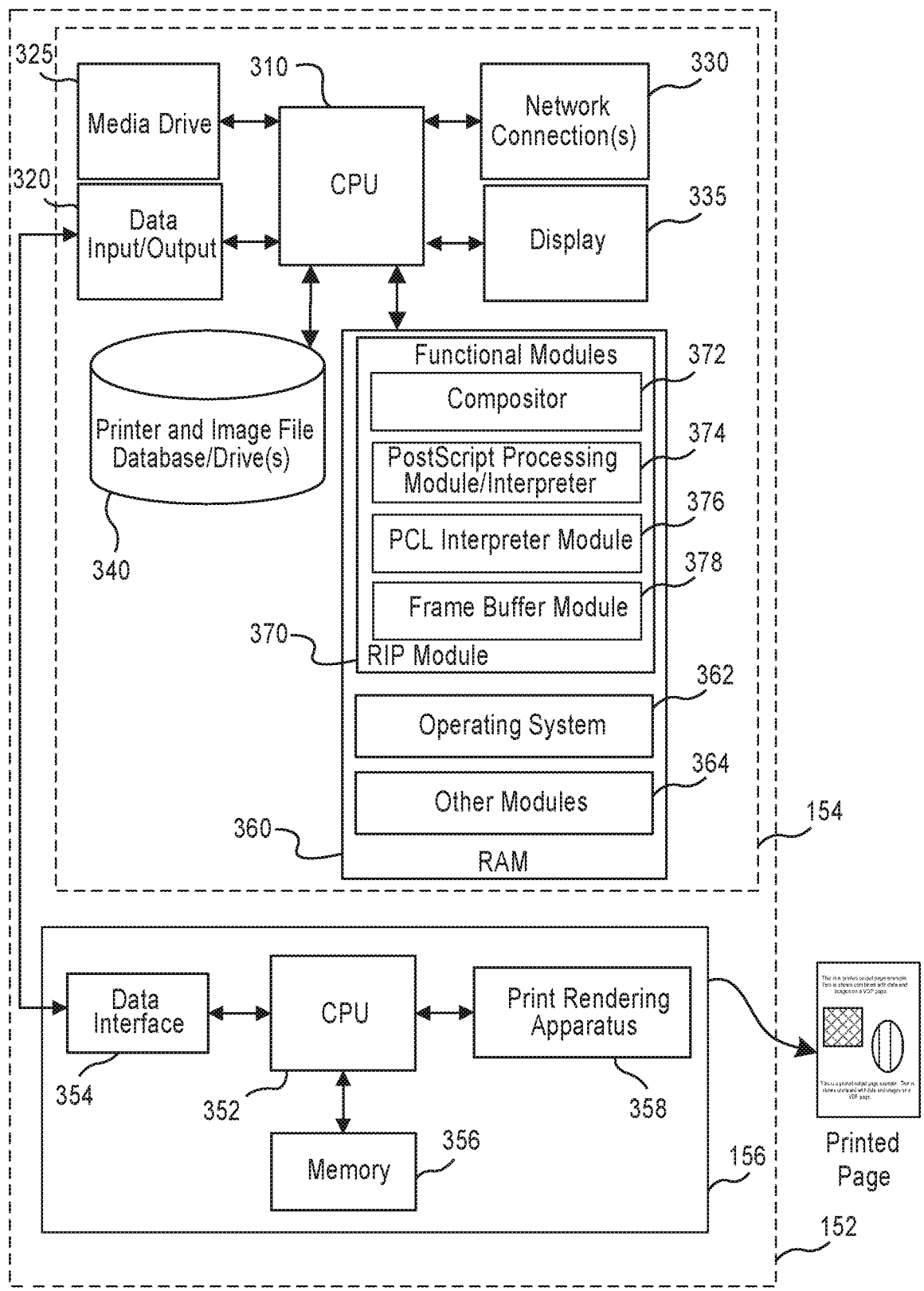
FIG. 3 is an illustration of an embodiment of a Printer System in accordance with aspects of the present disclosure.

Attention is now directed to FIG. 3 which illustrates a typical printer system configuration. Printer system 152 as shown in FIG. 3 may be a single printer or one of a plurality of printers in a printing system 150 as shown in FIG. 1. As described previously, printer system 152 includes a RIP module 154 and a rendering station module 156, and may include other elements (not shown). RIP module 154 may include one or more processors or CPU's 310, one or more data I/O modules 320 configured to interface between RIP 154 and rendering station 156, and a memory 360. Memory 360 further includes functional modules for providing the various functionalities as is described herein. These functional modules may include hardware elements, software elements, firmware elements, and/or combinations of these elements to implement various functionalities.

In particular, in a typical embodiment, the RIP may be in the form of a RIP software module 370 comprising a set of functional modules that may include a Compositor Module 372, one or more programming job processing modules such as a Postscript Processing Module 374, a PCL Interpreter Module 376 and/or other print job processing modules configured to generate a page layout based on a received print job. In addition, the functional modules may include page or frame buffer modules configured to store native page or frame information for transmission to the rendering station 156.

For example, frame buffer module may include a complete page in a dot pattern form that can be directly converted to printed output by the print rendering apparatus 358. Other functional modules such as operating system module 362 may also be stored in memory 360.

In addition, RIP 154 may include a database 340 that may be integrated with memory 360. Database 340 may be used to store data, information and objects such as are described herein, including pre-rasterized objects and objects provided in the print job to be rasterized by the RIP module 370. The compositor module 372 may be used for taking output from a PostScript interpreter 374 and PCL module 376 and combining them with other page elements in the frame buffer 378 to account for transparency, where supported (frame buffer 378 stores a bitmap of the printed output, and data loaded into the frame buffer as "transparent" will allow other data in the buffer at the same pixel location to show-through). RIP 154 may also include network connection module(s) 330 to facilitate network connectivity such as to typesetter 110 or to other systems or devices, as well as one or more media drives 325 (removable hard disk drives, CD, DVD, BD drives, Flash memory drives, USB drives, and the like) to facilitate input, output and storage of print jobs, storage and output of printer characterization data, image files and/or other data or information.

Rendering station 156 is configured to receive formatted page information, such as a page dot pattern, from RIP 154 and generate the printed output page in the print rendering apparatus 358's native resolution. While rendering stations 156 may have different configuration based on the type of printer system they are incorporated in, they will generally include at least a processor 352 or logic circuit equivalents such as a PLD, ASIC, etc., as well as memory 356 for storage of incoming data, and a print rendering apparatus 358 which generates the printed page output (such as by laser, ink jet, etc.).

In some embodiments, the printed page output is one or more of a postcard, a sheet of postcards, a roll of postcards, a document, a sheet of documents, a sheet of advertising flyers, and a sheet of letters. In some embodiments, the document is a personalized letter. In some embodiments, the document is an advertisement. In some embodiments, the document is a postcard. Postcards are popular way of advertising and soliciting through mail because they typically require less postage than a letter, and can be less expensive to print. Often a sender will have several different designs of postcards that are the same size and printed on the same paper stock, but created with data coming from different address banks or storage locations.

Figure 4:
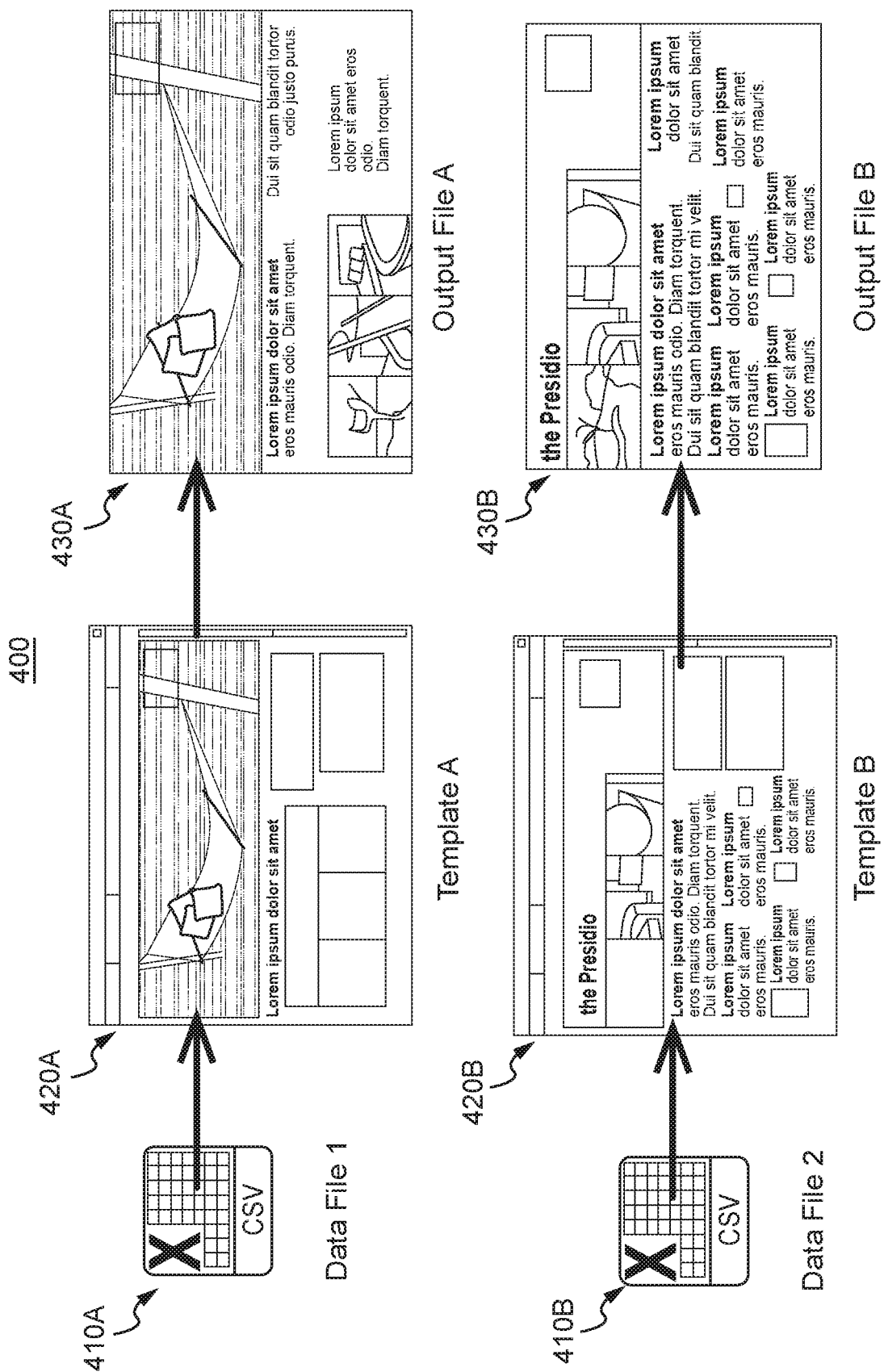
FIG. 4 is an illustration of a traditional method for creating an output file by populating a template with variable data from a data file.

In traditional workflows, the cards from each different design are composed and printed (possibly in postal sort order for the given design) but they are not co-mingled, because the data sets are different and are associated closely with each different postcard design. For example, as shown in FIG. 4, a document, such as a postcard, with a design A may need a different data file layout than a document with a design B. FIG. 4 is an illustration of a traditional method for creating an output file by populating a template with variable data from a data file. Method 400 includes using a first data file 410A to populate a first template 420A with selectively positioned variable printing data and generating an output file 430A, which may or may not be organized in a postal sort order. Similarly, a second data file 410B is used to populate a second template 420B with variable printing data and an output file 430B is generated. Even if the first template 420A is the same as the second template 420B, traditional typesetting products cannot commingle different data files 410A and 410B and compose to a single output file. As a result of this, traditionally small production runs of each postcard design are generated. However, small production runs of each postcard design may not be eligible for pre-sorted postal savings. If the first data file 410A and the second data file 410B for a single template were combined and pre-sorted, then the pre-sorted data was applied to a single template thereby generating a single pre-sorted output, there could be cost savings by pre-sorting the data and providing pre-sorted postcard trays to the USPS. However, this approach requires a single template be selected, and manipulating the data files, which may or may not be stored in the same format.

Traditionally, to achieve these results, each template would have to be deconstructed into a list of text frames and their positions and textual attributes and graphic frames and their attributes. The frame's attributes would include their x,y position, size, rotation and stacking order (z-order). Also it would contain all the text of the frame including variables to be inserted. For example:

Template A:
TextFrame1: PosX=7200, PosY=3600, Width=72000, Height= 14420, Content="<font name=Arial Black><pointsize=48>The Ultimate Getaway, <Firstname>"
TextFrame2: PosX=15300, PosY=9300, Width=2600, Height= 85900, Content="=″<font name=Arial Black><pointsize=12><Color=Red>Hurry, <firstname>, offer expires <expdate>!"
GraphicFrame1: PosX=8500, PosY=1200, Width=48300, Height=79500, Content=DestImage1

Template B:
TextFrame1: PosX=18400, PosY=1200, Width=75700, Height=4740, Content="<font name=Verdana><pointsize=36><b>Visit your home away from home, <Firstname>!"
TextFrame2: PosX=15300, PosY=9300, Width=2600, Height= 85900, Content="Hurry, <firstname>, offer expires <expdate>!"
GraphicFrame1: PosX=43200, PosY=7500, Width=435600, Height=2400,Content=DestImage1
GraphicFrame2: PosX=68200, PosY=7500, Width=435600, Height=2400,Content=DestImage2

In this example, the units are in 100ths of a point and the values Firstname, expdate and DestImage1 are variable content elements that are expected to be filled in from the data file. Note that textual formatting for the text frames is encoded as markup inside the text frame.

This information can be programmatically extracted from the design tool into markup, after a designer has mocked up the design in a page layout program. Once these frame positions are stored, then the following workflow can be accomplished: A data file using template A is acquired, i.e. a data file File1A. Then a data file using template B is acquired, i.e. a data file File1B. Note that since the variable data fields are going to be shared by the templates, the data file formats (variable names) have to be the same in File1A and File1B. A new data file format is created which contains the list of all fields in the original file, plus the frame attributes for all the text frames and graphic frames. Note that there has to be as many text frames and graphic frames as the maximum number of frames in each template. Therefore there will be unused frames in some data files.

These data files are then merged together and sorted in postal sort order. This intermingles the data from File1A and File1B together. The positions of the text frames and graphic frames are the intermingled. This data file then is the input to a new template. This new template has only blank text and graphic frames. The typesetting engine then reads this data file and for each record moves the blank text and graphic frames to their correct positions and fills in their content based on the data in the data file. This generates an imposed document as desired.

There are many limitations and difficulties with the aforementioned traditional system. For example, each template, after it is created in a page layout program, must be converted to its x,y coordinates. This precludes fast edits of design prior to data merge. The data file for each template has to be the same. There is no customization of data based on design. Each template has to have simple variable replacement—you cannot have complex rules per template that advanced typesetters allow. Data processing must all be performed upstream in the data collection end. A fair amount of data processing is needed to merge the data with each template's layout coordinates.

In order to resolve the deficiencies of traditional methods, embodiments according to the present disclosure include the following innovative aspects. A design can remain a template in its native form for the duration of the process. Changes can be made to the template late in the process. The data layout can be different for every different template (except for the name and address block.) Templates can have advanced rules to compute the value of frames. In fact, individual frames can be moved and resized (or pages turned on and off) based on the data. Since the composed output is what is stored, a full programmatic redesign of the document can be achieved on a record-by-record basis. The data processing is performed by the proposed solution.

Figure 5:
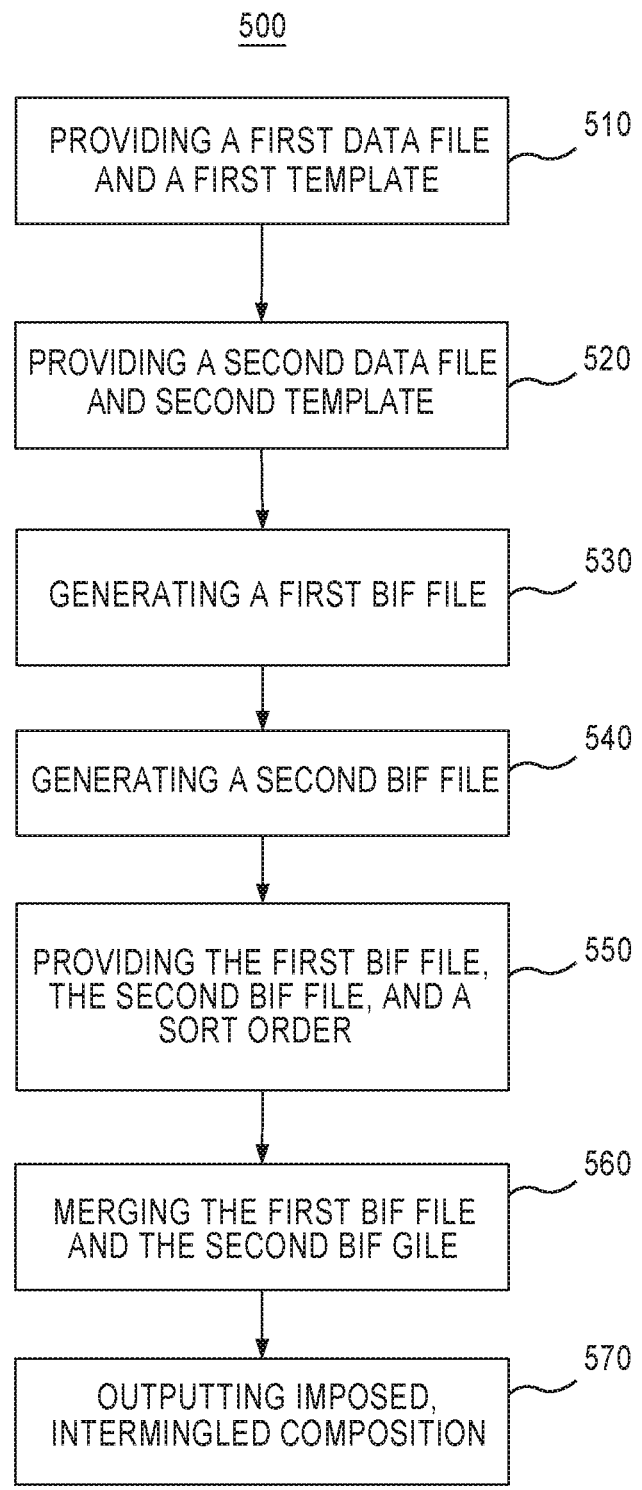
FIG. 5 is a flow chart of a method for preparing an imposed, intermingled output in a pre-sorted postal order, according to embodiments of the present disclosure.

In some embodiments, a method of preparing an imposed, intermingled output in a pre-sorted postal order is provided. FIG. 5 is a flow chart of a method for preparing an imposed, intermingled output in a pre-sorted postal order, according to embodiments of the present disclosure. Method 500 includes step 510 which provides a first data file and a first template to a composition engine. The first data file is stored in a first data storage file location and can be a spreadsheet, comma separated value (CSV) file, a data table, data held in a relational database, and other forms of organized data. The first data file contains variable data that is used to populate a variable data frame within the first template. The first template is stored in a first template location and can be any template that includes editable fields for variable data including text and graphics. The first template may also include the document layout, rules, and resources, among other elements. Similar to step 510, in step 520, a second data file store in a second data file storage location and a second template stored in a second template location are provided to the composition engine. The second locations containing the second data file and the second template can be the same or different than the first locations containing the first data file and the first template, and can be on the same or different device, same or different drive, same or different folder, or same or different file. The second data file contains variable data that is used to populate a variable data frame within the second template.

In step 530, a first intermediate file is generated by the composition engine, and in step 540, a second intermediate file is generated by the composition engine. In some embodiments, the first intermediate file and second intermediate file are binary intermediate files (BIFs). An intermediate file contains data from the data file and the template including positional data for variable print data locations within the template. Advantages according to present embodiments are that duplicated data within the data file is stored only once within the intermediate file. In this manner, data, e.g. a graphic, is stored once within the intermediate file and can be referenced at multiple locations within the intermediate file thus reducing the overall file size. Other advantages according to present embodiments are that the intermediate files standardize the format between the first data file, the first template, and the second data file and the second template. Other advantages according to present embodiments includes compatibility with many different types of templates, which can be considerably different in data input, rules, number of frames, etc. Still other advantages according to present embodiments are that read/write times are reduced for the optimized data structures of the intermediate files. Intermediate files can be stored to a memory or computer readable medium, or outputted to a second composition engine for further processing.

In step 550, the first intermediate file, the second intermediate file, and a sort order are provided to a composition engine. In step 560, the composition engine merges the data from the first intermediate file with the data from the second intermediate file based on the sort order. The merged data is the intermingled data from the first intermediate file and the second intermediate file, and can be stored into a memory as a third intermediate file or outputted to a second composition engine for further processing. The merged and intermingled data in the third intermediate file is arranged based on the provided sort order. The merged and intermingled data of the third intermediate file is also optimized to reduce duplicate data by storing the data once and then referencing the stored data in other parts of the file. Advantages according to present embodiments are that some of the processing that would otherwise take place at the RIP is shifted to the composition engine thereby increasing process throughput that may be rate limited by the RIP speed.

The merged intermediate file can be converted by the composition engine to one or more of a print-ready output file, including without limitation a PDF, a Postscript file, a VDX file, a PPML file, a HP-PPML file, a VPS file, a JLYT file, a VIPP file, a Digimaster-PS file, a JPG file, a PDF/VT file, an APF, and a HTML file. In step 570, the converted output is a merged and intermingled composition of data from the first data file, first template file, second data file, and second template file. Converting the output to renderable format requires no additional input data other than the print order of the commingled records. In this manner, an intermediate file contains all of the information required to reproduce a template containing the variable printing data, except a specified font set. The converted output can be transmitted to a printing system for rendering a printed output on card or paper stock. When printed, the individual printed pieces are pre-sorted by a postal carrier route.

The printed output on the sheet of card or paper stock can contain documents from multiple print jobs, or in other words, the printed output on the sheet of card or paper stock can be ganged. The printing system imposes each postcard on the sheet of paper stock in the correct position so that when the sheet is cut, stacked, and/or folded the documents would be in the correct postal sort order. Note that the teachings according to present embodiments are not limited to postal sorting, and can be applied to other types of sorting. Alternate embodiments include systems and methods which may be used for various other delivery, storage and warehousing locations methods using extended postal codes, bar codes, shipment tracking codes, zip codes, extended zip codes, street addresses and addressee identifiers, shelf codes, bin codes, internal mail delivery codes, email addresses, truck or load identifiers, routing code, SKU codes, Qcodes, event codes (for a specific conference, date, promotion or campaign), and the like. As well, the output may include, along with the printed documents, digital versions of output documents requiring storage in digital asset management systems, file directories, online catalogs, and so forth.

Figure 6:
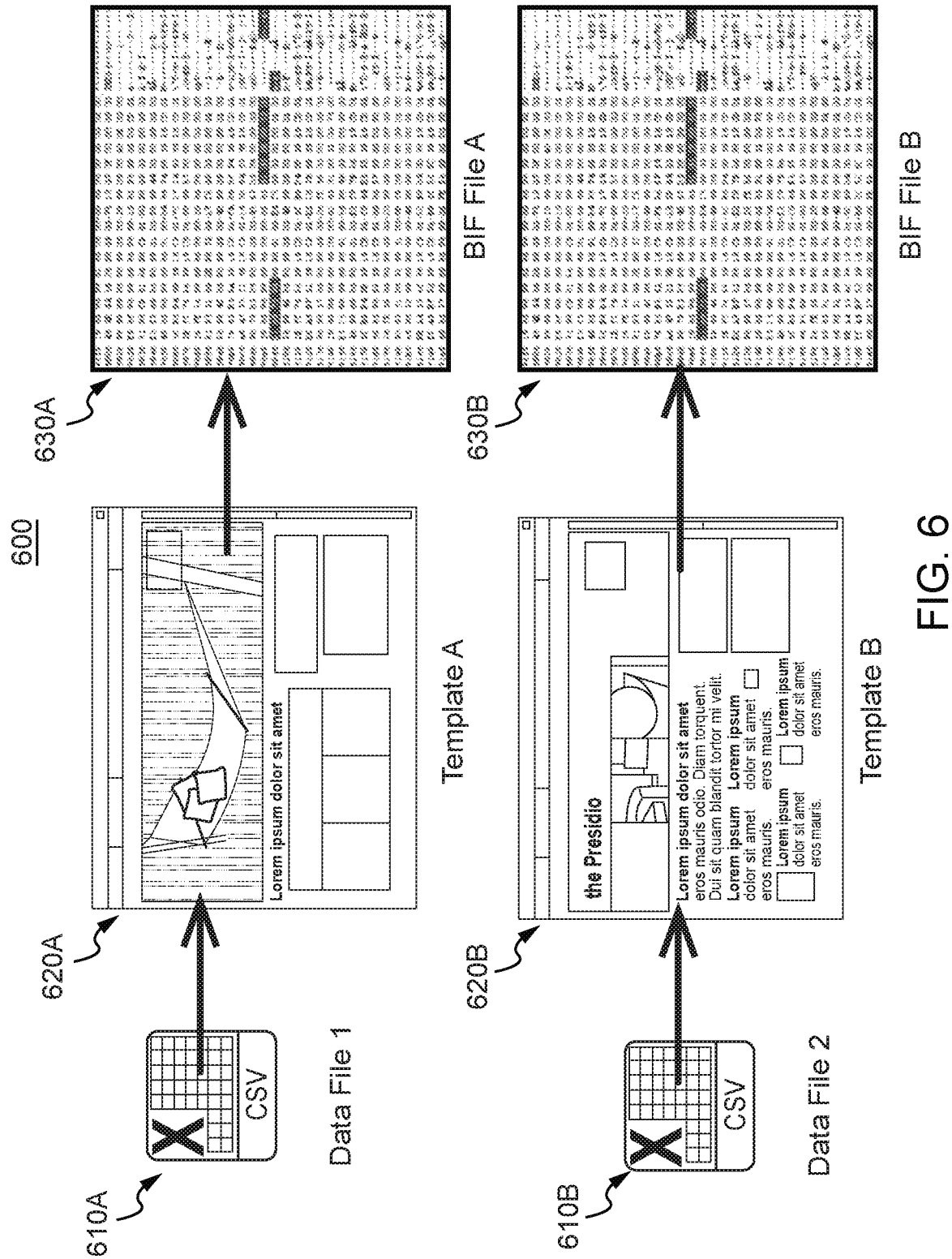
FIG. 6 is an illustration of a method for creating an intermediate file, according to embodiments of the present disclosure.

FIG. 6 is an illustration of a method 600 for creating an intermediate file, according to embodiments of the present disclosure. Method 600 includes providing a first data file 610A and a first template 620A to a composition engine that generates a binary intermediate file 630A. Similarly, a second file 610B and a second template 620B are provided to a composition engine that generates a binary intermediate file 630B. In this illustration, the data files are in an Excel CSV and the templates are in a proprietary XML format.

Figure 7:
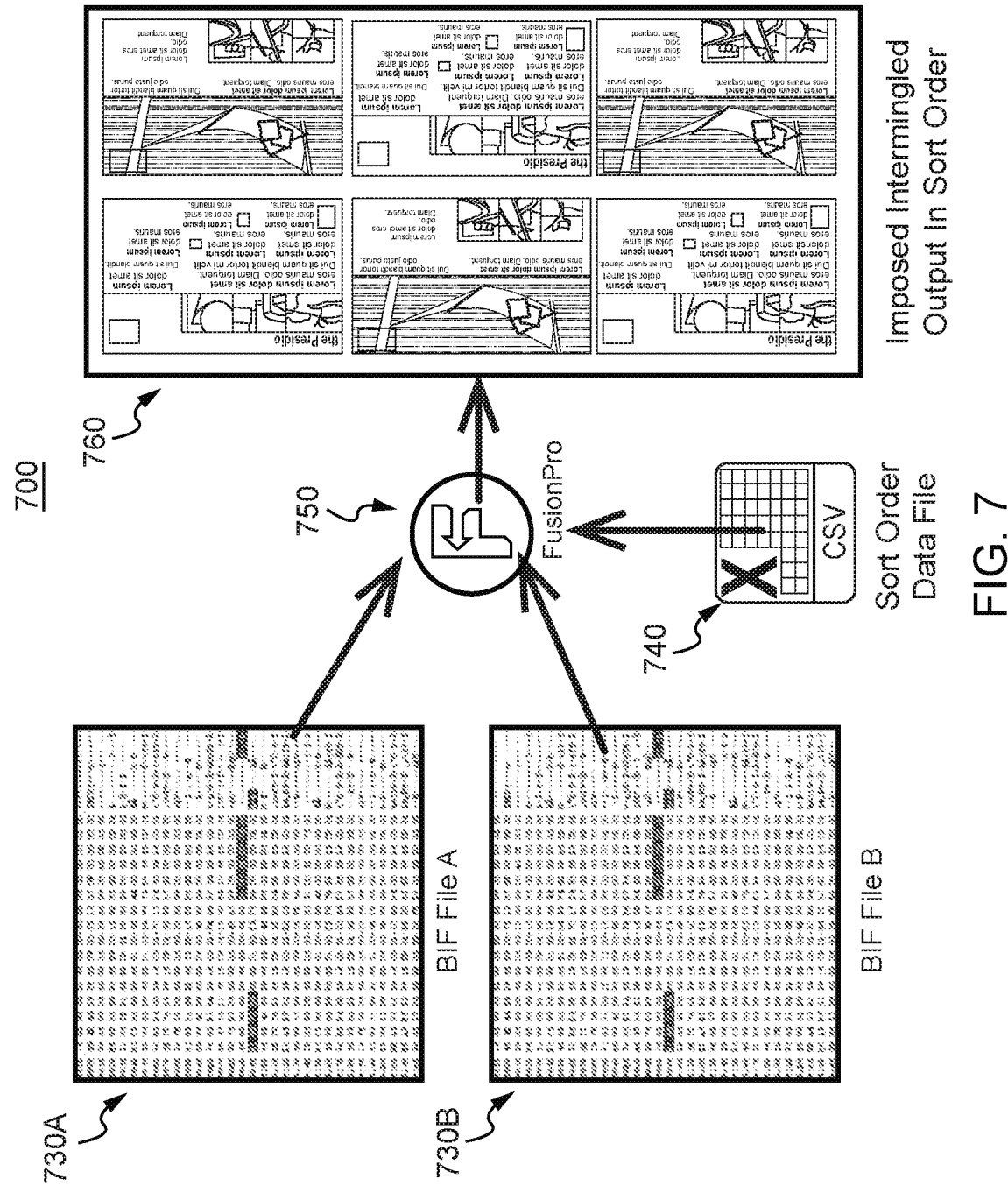
FIG. 7 is an illustration of a method for composing an imposed, intermingled output in a pre-sorted postal order from an intermediate file, according to embodiments of the present disclosure.

FIG. 7 is an illustration of a method 700 for composing an imposed, intermingled output in a pre-sorted postal order from an intermediate file, according to embodiments of the present disclosure. For reference, these binary intermediate files are called BIF files. Method 700 includes providing a first binary intermediate file 730A, a second binary intermediate file 730B, and a sort order data file 740 to a composition engine 750. The composition engine 750 merges and intermingles the first binary file 730A and the second binary file 730B according to the sort order data file 740 and to generate a third binary information file (not shown). The third binary intermediate file contains all of the data, rule, pictures, and other resources necessary to convert the resulting BIF file into a renderable output file. Typically, no other inputs are required to convert the resulting BIF file into the renderable output file, e.g. a PDF file, except for one or more specified font sets of a print order.

When the data file layouts are the same for all of the documents, certain optimizations can be performed. In this case, all the templates use the same data layout. For example, FIG. 8 shows a portion of a master data file 800 that includes an entry in column L indicating the template or layout corresponding to the given variable data found in columns A-K. The composition engine can optimize the workflow by generating the individual data files and merging intermediate files, all based on the template or layout field specified in the master data file 800.

Figure 9:
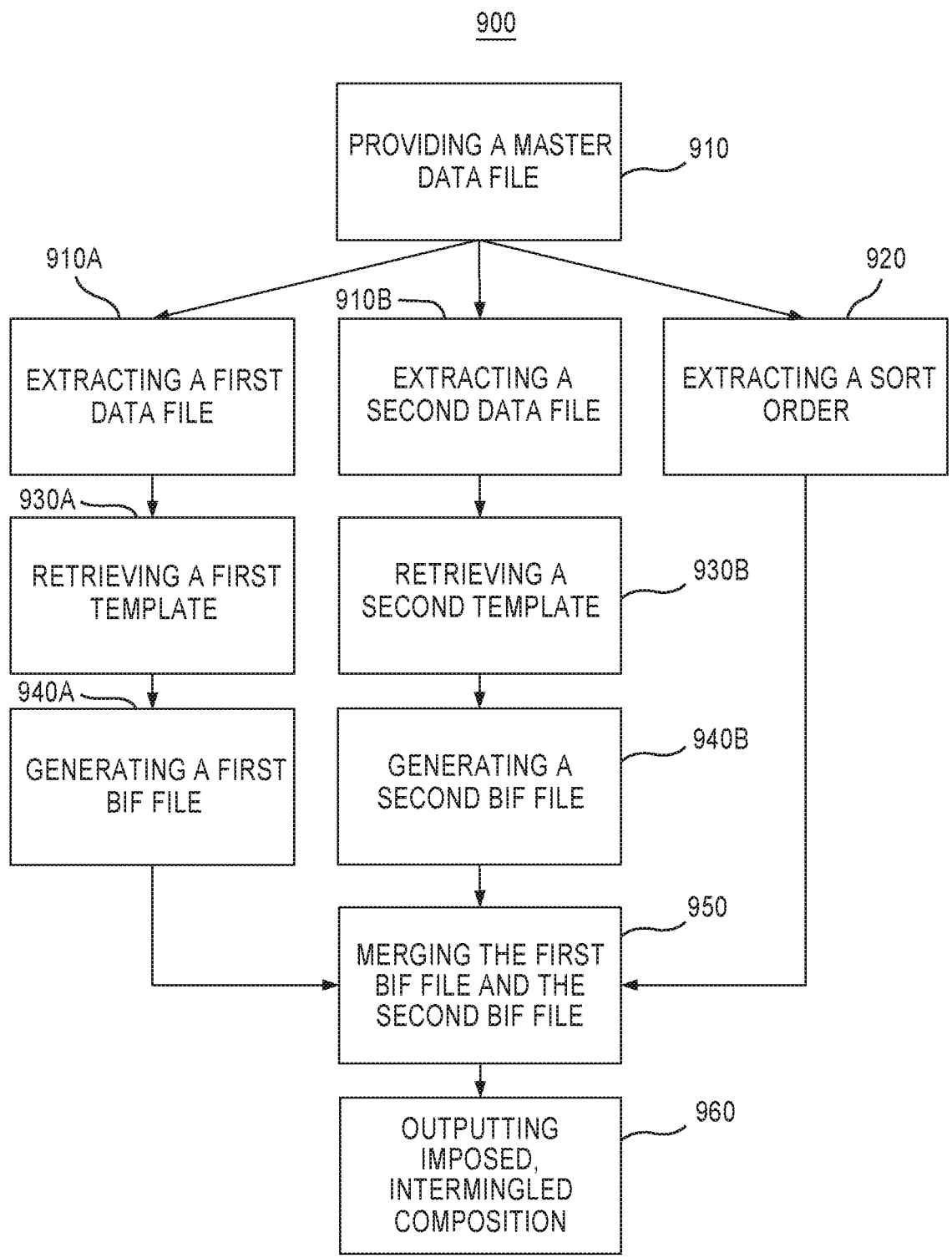
FIG. 9 is a flow chart of a method for composing an imposed, intermingled output in a pre-sorted postal order from a master data file, according to embodiments of the present disclosure.

FIG. 9 is a flow chart of a method 900 for preparing an imposed, intermingled output in a pre-sorted postal order from a master data file, according to embodiments of the present disclosure. Method 900 includes step 910 which provides a master data file to a composition engine from a master data file storage location. In step 910A, the composition engine extracts a first data file from the master data file. The first data file is stored to a first data file location and can be a spreadsheet, a comma separated value (CSV) file, a data table, data held in a relational database, and other forms of organized data. The first data file contains variable data that is used to populate the first template. In step 930A, the composition engine retrieves a first template. The first template can be retrieved from a first template location and can be any template that includes editable fields for variable data including text and graphics. The first template may include the document layout, rules, and resources, among other elements.

In step 910B, the composition engine extracts a second data file from the master data file. The second data file is stored to a second data file location and can be a spreadsheet, a comma separated value (CSV) file, a data table, data held in a relational database, and other forms of organized data. The second data file contains variable data that is used to populate the second template. In step 930B, the composition engine retrieves a second template. The second template can be retrieved from a second template location and can be any template that includes editable fields for variable data including text and graphics. The second template may also include the document layout, rules, and resources, among other elements.

In some cases, the master data file also includes sort order data. In step 920, the composition engine extracts a sort order file. The sort order file is stored to a sort order file location and can be a spreadsheet, a comma separated value (CSV) file, a data table, data held in a relational database, and other forms of organized data. In cases where the master data file does not include sort order data, the sort order data can be provided to the composition engine from a sort order data storage location.

In step 940A, first intermediate file is generated by the composition engine, and in step 940B, a second intermediate file is generated by the composition engine. In some embodiments, the first intermediate file and the second intermediate file are a binary intermediate files (BIF). The first intermediate file contains data from the first data file and the first template, and the second intermediate file contains data from the second data file and the second template. Intermediate files can be stored to a memory or outputted to a second composition engine for further processing. Advantages according to present embodiments are that duplicated data within the data file is stored only once within the intermediate file. In this manner, the data that is stored once within the intermediate file can be referenced at multiple locations within the intermediate file thus reducing the overall file size. Other advantages according to present embodiments are that the intermediate files standardize the format between the first data file, the first template, and the second data file and the second template. Still other advantages according to present embodiments includes compatibility with many different types of templates, which can be considerably different in data input, rules, number of frames, etc.

In step 950, the first intermediate file, the second intermediate file, and a sort order are merged and intermingled by the composition engine. In other words, the composition engine merges the data from the first intermediate file with the data from the second intermediate file based on the sort order. The merged data is intermingled data that can be stored into a memory as a third intermediate file or outputted to a second composition engine for further processing. The merged and intermingled data in the third intermediate file is arranged based on the sort order data file. The merged and intermingled data of the third intermediate file is also optimized to reduce duplicate data by storing the data once and then referencing the stored data in other parts of the file.

The merged intermediate file can be converted by the composition engine to one or more of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file. In step 960, the converted output is a merged and intermingled composition of data from the first data file, first template file, second data file, and second template file. Converting the output to renderable format requires no additional input data other than the print order of the commingled records. In this manner, an intermediate file contains all of the information required to reproduce a template containing the variable printing data, except the specified font set. The converted output can be transmitted to a printing system for rending a printed output on card or paper stock. The printed output on the sheet of card or paper stock can contain documents from multiple print jobs, or in other words, the printed output on the sheet of card or paper stock can be ganged. The printing system imposes each postcard on the sheet of card or paper stock in the correct position so that when the sheet is cut, stacked, and/or folded the documents would be in the correct postal sort order.

Figure 10:
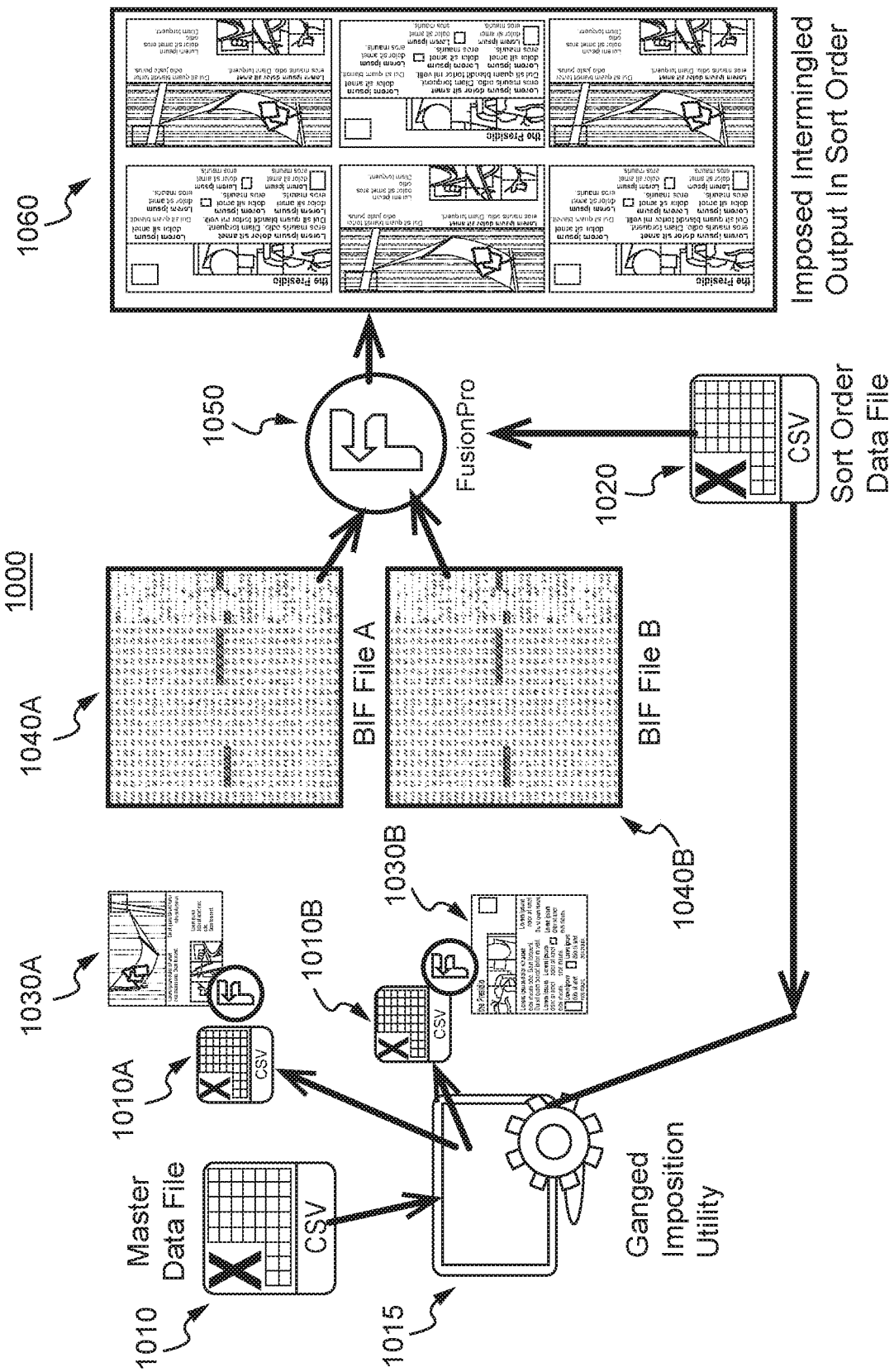
FIG. 10 is an illustration of a method for composing an imposed, intermingled output in a pre-sorted postal order from a master data file, according to embodiments of the present disclosure.

FIG. 10 is an illustration of a method 1000 for composing an imposed, intermingled output in a pre-sorted postal order from a master data file, according to embodiments of the present disclosure. Method 1000 includes step 1010 which provides a master data file to a composition engine 1015 or ganged imposition utility. The master data file can be a spreadsheet, a comma separated value (CSV) file, a data table, data held in a relational database, and other forms of organized data. In step 1010A, the composition engine extracts a first data file from the master data file. The first data file is stored to a first data file location and can be a spreadsheet, a comma separated value (CSV) file, a data table, data held in a relational database, and other forms of organized data. The first data file contains variable data that is used to populate the first template. In step 1030A, the composition engine retrieves a first template. The first template can be retrieved from a first template location and can be any template that includes editable fields for variable data including text and graphics. The first template may also include the document layout, rules, and resources, among other elements.

In step 1030B, the composition engine extracts a second data file from the master data file. The second data file is stored to a second data file location and can be a spreadsheet, comma separated value (CSV) file, a data table, data held in a relational database, and other forms of organized data. The second data file contains variable data that is used to populate the second template. In step 1030B, the composition engine retrieves a second template. The second template can be retrieved from a second template location and can be any template that includes editable fields for variable data including text and graphics. The second template may also include the document layout, rules, and resources, among other elements.

In some cases, the master data file also includes sort order data. In step 1020, the composition engine extracts a sort order file. The sort order file is stored to a sort order file location and can be a spreadsheet, comma separated value (CSV) file, a data table, data held in a relational database, and other forms of organized data. In cases where the master data file does not include sort order data, the sort order data can be provided to the composition engine from a sort order data storage location.

In step 1040A, first intermediate file is generated by the composition engine, and in step 1040B, a second intermediate file is generated by the composition engine. In some embodiments, the first intermediate file and the second intermediate file are a binary intermediate files. The first intermediate file contains data from the first data file and the first template, and the second intermediate file contains data from the second data file and the second template. Advantages according to present embodiments are that duplicated data within the data file is stored only once within the intermediate file. In this manner, the data that is stored once within the intermediate file can be referenced at multiple locations within the intermediate file thus reducing the overall file size. Other advantages according to present embodiments are that the intermediate files standardize the format between the first data file, the first template, and the second data file and the second template. Intermediate files can be stored to a memory or outputted to a second composition engine for further processing.

In step 1050, the first intermediate file, the second intermediate file, and a sort order are merged and intermingled by the composition engine. In other words, the composition engine merges the data from the first intermediate file with the data from the second intermediate file based on the sort order. The merged data is intermingled data that can be stored into a memory as a third intermediate file or outputted to a second composition engine for further processing. The merged and intermingled data in the third intermediate file is arranged based on the sort order data file. The merged data of the third intermediate file is also optimized to reduce duplicate data by storing the data once and then referencing the stored data in other parts of the file.

The merged and intermingled intermediate file can be converted by the composition engine to one or more of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file. In step 1060, the converted output is an intermingled composition of data from the first data file, first template file, second data file, and second template file. Converting the output to renderable format requires no additional input data other than the print order of the commingled records. In this manner, an intermediate file contains all of the information required to reproduce a template containing the variable printing data. The converted output can be transmitted to a printing system for rending a printed output on card or paper stock. The printed output on the sheet of card or paper stock can contain documents from multiple print jobs, or in other words, the printed output on the sheet of card or paper stock can be ganged. The printing system imposes each document on the sheet of card or paper stock in the correct position so that when the sheet is cut, stacked, and or folded, the documents would be in the correct postal sort order.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel method when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

While various embodiments have been described above in terms of a "first" and a "second" item, it should be understood that the respective system, methods, and apparatus may include more than two items, and two item embodiments are presented by way of example only, and not as a limitation.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded into one or more different computers or other processors to implement various aspects of the present disclosure as discussed above.

The terms "program" or "software" or "code" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method, comprising:
generating, using a composition engine, a first intermediate file from a first data file and a first template;
generating, using the composition engine, a second intermediate file from a second data file and a second template;
receiving, at the composition engine, a sorting data file; and
composing, using the composition engine, a third intermediate file, the third intermediate file including contents from the first intermediate file and the second intermediate file merged based in part on the sorting data file.

2. The method of claim 1, wherein the sorting data file includes data associated with sorting based on at least one of extended postal codes, bar codes, shipment tracking codes, zip codes, extended zip codes, street addresses and addressee identifiers, shelf codes, bin codes, internal mail delivery codes, email addresses, truck or load identifiers, routing code, SKU codes, Qcodes, or event codes.

3. The method of claim 1, further comprising:
extracting at least one of the first data file, the second data file, or the sorting data file from a master data file.

4. The method of claim 1, further comprising:
converting the third intermediate file into a renderable output file.

5. The method of claim 4, wherein the renderable output file is at least one of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file.

6. The method of claim 4, wherein converting the third intermediate file to the renderable output file requires no additional input data other than a print order.

7. The method of claim 4, further comprising:
transmitting the renderable output file to a printing system.

8. The method of claim 7, further comprising:
rendering a printed output on a sheet of paper stock.

9. The method of claim 8, wherein the printed output on the sheet of paper stock is a ganged and imposed sheet including variable printing data.

10. The method of claim 1, wherein the first intermediate file and the second intermediate file are binary files.

11. The method of claim 1, further comprising:
storing the first intermediate file and the second intermediate file to a memory.

12. The method of claim 1, wherein the first intermediate file and the second intermediate file contain positional data for variable print data locations within the first template and the second template.

13. The method of claim 1, wherein the sort order file is a CSV file.

14. The method of claim 1, wherein the first data storage location and the second data storage location are located on a same device.

15. The method of claim 1, wherein the first template and the second template are stored in a same file.

16. The method of claim 1, wherein the composition engine is part of a sub-system that also includes a typesetter human interface.

17. The method of claim 16, further comprising:
selecting, via the sub-system, the first template and the second template.

18. A method, comprising:
retrieving a first template from a first storage location;
retrieving a second template from a second storage location;
generating, using a composition engine, a first intermediate file from a first data file and the first template;
generating, using the composition engine, a second intermediate file from a second data file and the second template; and
composing, using the composition engine, a third intermediate file, the third intermediate file including contents from the first intermediate file and the second intermediate file merged based in part on the sorting data file.

19. The method of claim 18, wherein the sorting data file includes data associated with sorting based on at least one of extended postal codes, bar codes, shipment tracking codes, zip codes, extended zip codes, street addresses and addressee identifiers, shelf codes, bin codes, internal mail delivery codes, email addresses, truck or load identifiers, routing code, SKU codes, Qcodes, or event codes.

20. The method of claim 18, further comprising:
extracting at least one of the first data file, the second data file, or the sorting data file from a master data file.

21. The method of claim 18, further comprising:
converting the third intermediate file into a renderable output file.

22. The method of claim 21, wherein the renderable output file is at least one of a PDF, a Postscript file, a VDX file, a PPML file, a HP-PPML file, a VPS file, a JLYT file, a VIPP file, a Digimaster-PS file, a JPG file, a PDF/VT file, an APF, and a HTML file.

23. The method of claim 21, wherein converting the third intermediate file to the renderable output file requires no additional input data other than the print order.

24. The method of claim 21, further comprising:
transmitting the renderable output file to a printing system.

25. The method of claim 24, further comprising:
rendering a printed output on a sheet of paper stock.

26. The method of claim 25, wherein the printed output on the sheet of paper stock is a ganged and imposed sheet including variable printing data.

27. The method of claim 18, wherein the first intermediate file and the second intermediate file are binary files.

28. The method of claim 18, further comprising:
storing the first intermediate file and the second intermediate file to a memory.

29. The method of claim 18, wherein the first intermediate file and the second intermediate file contain positional data for variable print data locations within the first template and the second template.

30. The method of claim 18, wherein the sort order file is a CSV file.

31. The method of claim 18, wherein the first data storage location and the second data storage location are located on a same device.

32. The method of claim 18, wherein the first template and the second template are stored in a same file.

33. The method of claim 18, wherein the composition engine is part of a sub-system that also includes a typesetter human interface.

34. The method of claim 33, further comprising:
selecting, via the sub-system, the first template and the second template.

* * * * *